United States Patent Office 3,464,344
Patented Sept. 2, 1969

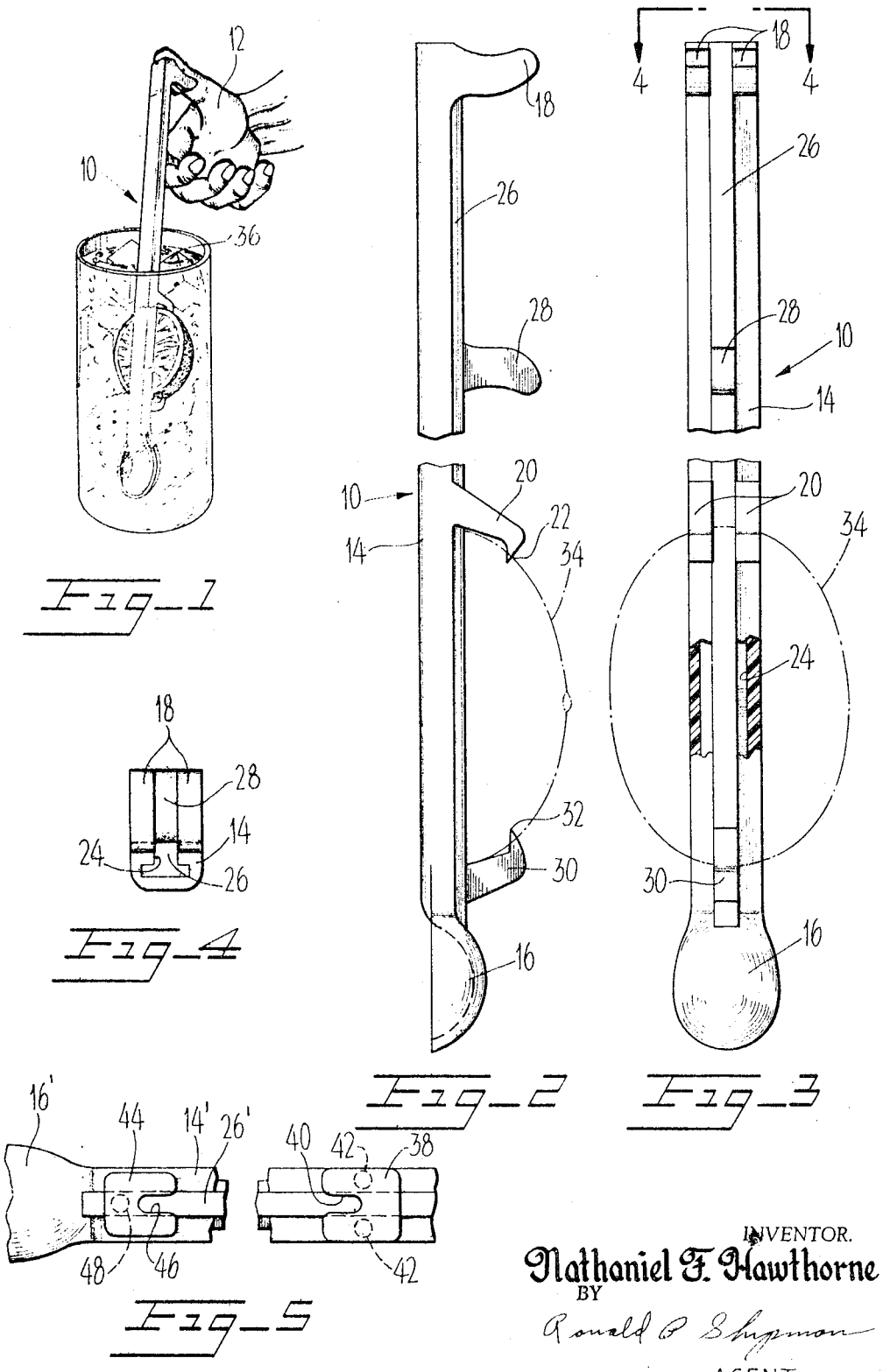

3,464,344
JUICE EXTRACTOR
Nathaniel F. Hawthorne, 855 Cedar St.,
Alameda, Calif. 94501
Filed Dec. 14, 1967, Ser. No. 690,604
Int. Cl. B30b 9/06, 15/08
U.S. Cl. 100—102          7 Claims

ABSTRACT OF THE DISCLOSURE

A combination beverage stirrer and citrus fruit section squeezer operable with one hand of a human operator for rapid easy extraction of the section's juices directly into a beverage.

Background, field of invention

This invention pertains to a juice extraction apparatus, and more particularly concerns an improved, simple, citrus fruit and the like, section gripping and squeezing device.

Background, prior art

When handling a citrus fruit section, such as for example, a slice of lemon, and squeezing it to extract its juices into a glass of a beverage, such as iced tea, the unpredictable nature of the release of the juices oftentimes causes undesirable squirting of the juices into the face of a person, or onto table tops, etc. Further, direct contact of the fingers wth a squeezed lemon slice usually leaves the fingers in a stick mess state.

In the past, various devices have been developed to squeeze a citrus fruit section, but which have been of rather complex, expensive construction and are awkward to handle or operate.

Summary

The present invention is an economically manufactured, easy to operate, apparatus which may be incorporated, if desired, with a beverage stirrer to securely grip a lemon slice or the like, to immerse the gripped slice into the liquid of a beverage contained in a glass or other wide mouth container, and to squeeze the lemon section to extract its juices into the beverage without having to touch the lemon slice directly while squeezing. By immersing the lemon slice in the beverage while squeezing obviates any squirting of lemon juices into a person's face or other locations.

It is therefore an object of the present invention to provide an improved citrus fruit, and the like, juice extractor.

Another object of the present invention is to provide an apparatus for extracting the juices from a section of citrus fruit in a manner that obviates undesirable squirting.

Still another object of the present invention is to provide a citrus fruit section holder and squeezer that may also be used to stir a beverage.

The features of novelty that are considered characteristic of this invention are set forth with particularity in the appended claims. The organization and method of operation of the invention may best be understood from the following description when read in connection with the accompanying drawings.

Brief description of the drawings

FIGURE 1 is a perspective illustration showing the preferred method of operation of the present invention.
FIGURE 2 is a side elevation showing the construction of a preferred embodiment of the present invention.
FIGURE 3 is a plan view of the structure of FIG. 2.
FIGURE 4 is an end view of the structure of FIGURES 3 and 4 looking in the direction of arrows 4—4 of FIG. 3.
FIGURE 5 is a simplified plan view showing a modified form of the present invention.

Description

In FIG. 1 there is shown the citrus fruit section juice extractor apparatus 10 of the present invention being held and operated by the thumb and index finger of one hand 12 of an operator. Further details of the operation of the juice extractor apparatus and advantages resulting therefrom will be described more fully below.

The construction of one preferred embodiment of the juice extractor apparatus is more particularly shown in FIGS. 2, 3, and 4. As shown in FIGS. 2 and 3 the juice extractor apparatus includes an elongated first member or rod 14 one or lower end of which is formed into a spoon-like beverage stirring means 16. The member 14 may be comprised of any suitable material having some degree of stiffness for the purpose involved such as for example, metal, plastic, wood, etc. The preferred material is stiff plastic in view of its ease and economy of fabrication. The spoon-like means 16 may be formed integral with the member 14 or may be a separate part suitably secured to the lower end of member 14. It will be clear, as the description proceeds that the spoon-like means 16 may be left off of the lower end of the member 14, if desired.

The upper end of the member 14 is formed with a first finger engagable dog 18 which extends generally outwardly of the longitudinal direction of the member 14. A citrus fruit section engaging dog 20 is formed on the member 14 near its lower end. The dog 20 is spaced upwardly from the spoon-like means 16 by a distance somewhat greater than the major diameter of the largest citrus fruit section 34 to be expected to be used with the present invention. The dog 20 is inclined at an angle toward the lower end of the member 14 and is preferably provided with a sharp point or edge 22 for reliable gripping contact with the citrus fruit section as will be described below.

The elongated member 14 is provided with a slot 24 extending from the top of the member to the spoon-like means. The slot opens radially of the member 14 in the same direction as the dogs 18 and 20; the slot also cuts through the dogs 18 and 20. As best shown in FIG. 4 the slot 24 is T-shaped in cross-section with the horizontal portion being the radially inner portion. This slot 24 is provided to securely retain a complementary elongated member 26 in sliding relation with the member 14.

As shown in FIGS. 2, 3, and 4 the second elongated member 26 is T-shaped in cross-section to complementarily fit within the slot 24 with a portion extending radially outwardly of the slot. The member 26 slidably frictionally engages the walls of the slot 24 for releasable retention of the member 26 in position with respect to the member 14.

A second finger engageable dog 28 is provided on the upstanding part of the member 26 at a location between the first finger engageable dog 18 and first citrus fruit engaging dog 22 and extends in the same general direction as dog 18. Further, a second citrus fruit engaging dog 30 is provided on the upstanding portion of the member 26 at a location between the spoon-like means 16 and first citrus engaging dog 20 and extends or inclines toward the first citrus engaging dog 20. The second citrus engaging dog is provided with a sharp point or edge 32 like edge 22 of dog 20. The width of second dogs 28 and 30 is equal to or smaller than the slotted portion of first dogs 18 and 20, thereby facilitating easy insertion of member 26 into operating relation with member 14 as shown in FIGS. 1–4.

To operate the preferred embodiment, a citrus fruit section 34, such as for example, a half lemon, as shown in FIGS. 1–4 is manually inserted between the two citrus engaging dogs 20 and 30 with the flat, cut surface of the section facing toward the members 14 and 26, and the rind or skin facing in the opposite direction. Two fingers of one hand, such as for example, the index finger and the thumb are then applied to the two finger engageable dogs 18 and 28 so as to apply a force to bring the two dogs together. As the two finger engageable dogs are brought together the two citrus engaging dogs 20 and 30 are brought together, thereby causing the sharp edges 22 and 32 to grip the skin portion of the citrus section.

Then the spoon-like means 16 and the lower portion of the members 14 and 26 with the gripped citrus section is immersed in a beverage 36 as shown in FIG. 1. Further squeezing of the two dogs 18 and 28 will cause the citrus section to be forceably squeezed between the dogs 20 and 30 and the juice from the citrus section will flow directly into the beverage. It can thus be appreciated that no squirting of the citrus juices into a person's face can take place since the beverage acts as a collector or shield for the extracted juices. The entire apparatus 10 can then be moved about in the beverage to stir or mix the citrus juices thoroughly with the beverage.

In FIG. 5 there is shown a modified form of citrus engaging dogs to securely grip slices of citrus rather than sections of citrus fruit heretofore described. As shown in FIG. 5 a first citrus engaging dog 38 having a slot 40 opening toward the spoon-like means 16' is mounted on first member 14', by means of posts 42 engaged in suitably provided holes. A second citrus engaging dog 44 having a slot 46 opening toward the slot 40 of dog 38 is mounted on the upstanding portion of member 26' by means of a post 48 engaged in a suitably provided hole. The width of slots 40 and 46 should be slightly less than the thickness of a citrus slice, such as for example, an orange slice. The slice is frictionally fitted into the two slots 40 and 46 and then the apparatus is operated in the same manner as described for FIGS. 1–4 to extract the slice's juices directly in a beverage.

It will be understood that other forms of members 14' and 26' can be used, such as for example a round or keystone shaped member 26' can be accommodated in a round or keystone shaped slot in member 14'.

What is claimed is:

1. A citrus product juice extraction apparatus comprising: a first elongated member having opposite ends, said first member having a first finger engageable dog at one end thereof, and a product engageable dog intermediate said ends; a second elongated member having opposite ends, said second member having a second finger engageable dog intermediate said ends of said second member, and a product engageable dog intermediate said ends of said second member; said members being disposed in longitudinally sliding relation with each other with the finger engageable dog of said second member being between said dogs of said first member, and the product engageable dog of the first member being between said dogs of said second member; said first member including a spoon-like means at the other end thereof.

2. The apparatus according to claim 1 wherein said first and scond member are frictionally slidable in their longitudinal directions with respect to each other.

3. A citrus product juice extraction apparatus comprising: a first elongated member having opposite ends, said first member having a first finger engageable dog at one end thereof, and a product engageable dog intermediate said ends; a second elongated member having opposite ends, said second member having a second finger engageable dog intermediate said ends of said second member, and a product engageable dog intermediate said ends of said second member; said members being disposed in longitudinally sliding relation with each other with the finger engageable dog of said second member being between said dogs of said first member, and the product engageable dog of the first member being between said dogs of said second member; said first member being provided with a longitudinal slot opening radially outwardly thereof, and wherein said second member complementarily fits within said slot.

4. The apparatus according to claim 3 wherein said slot is T-shaped in cross-section.

5. A citrus product juice extraction apparatus comprising: a first elongated member having opposite ends, said first member having a first finger engageable dog at one end thereof, and a product engageable dog intermediate said ends; a second elongated member having opposite ends, said second member having a second finger engageable dog intermediate said ends of said second member, and a product engageable dog intermediate said ends of said second member; said members being disposed in longitudinally sliding relation with each other with the finger engageable dog of said second member being between said dogs of said first member, and the product engageable dog of the first member being between said dogs of said second member; each of said product engaging dogs being provided with a slot, each slot opening outwardly of the associated dog and facing the slot of the other dog.

6. The apparatus of claim 3 wherein said product engageable dogs are disposed in convergent relation to each other.

7. The apparatus of claim 6 wherein at least one of said product engageable dogs includes a sharpened portion for engagement with a citrus product.

References Cited

UNITED STATES PATENTS

| 831,127 | 9/1906 | Williams | 294—34 |
|---|---|---|---|
| 1,835,966 | 12/1931 | Pochyla | 100—133 |
| 2,678,000 | 5/1954 | Scheidt et al. | 100—295 XR |

BILLY J. WILHITE, Primary Examiner

U.S. Cl. X.R.

100—126, 295; 294—103